Figure 1:
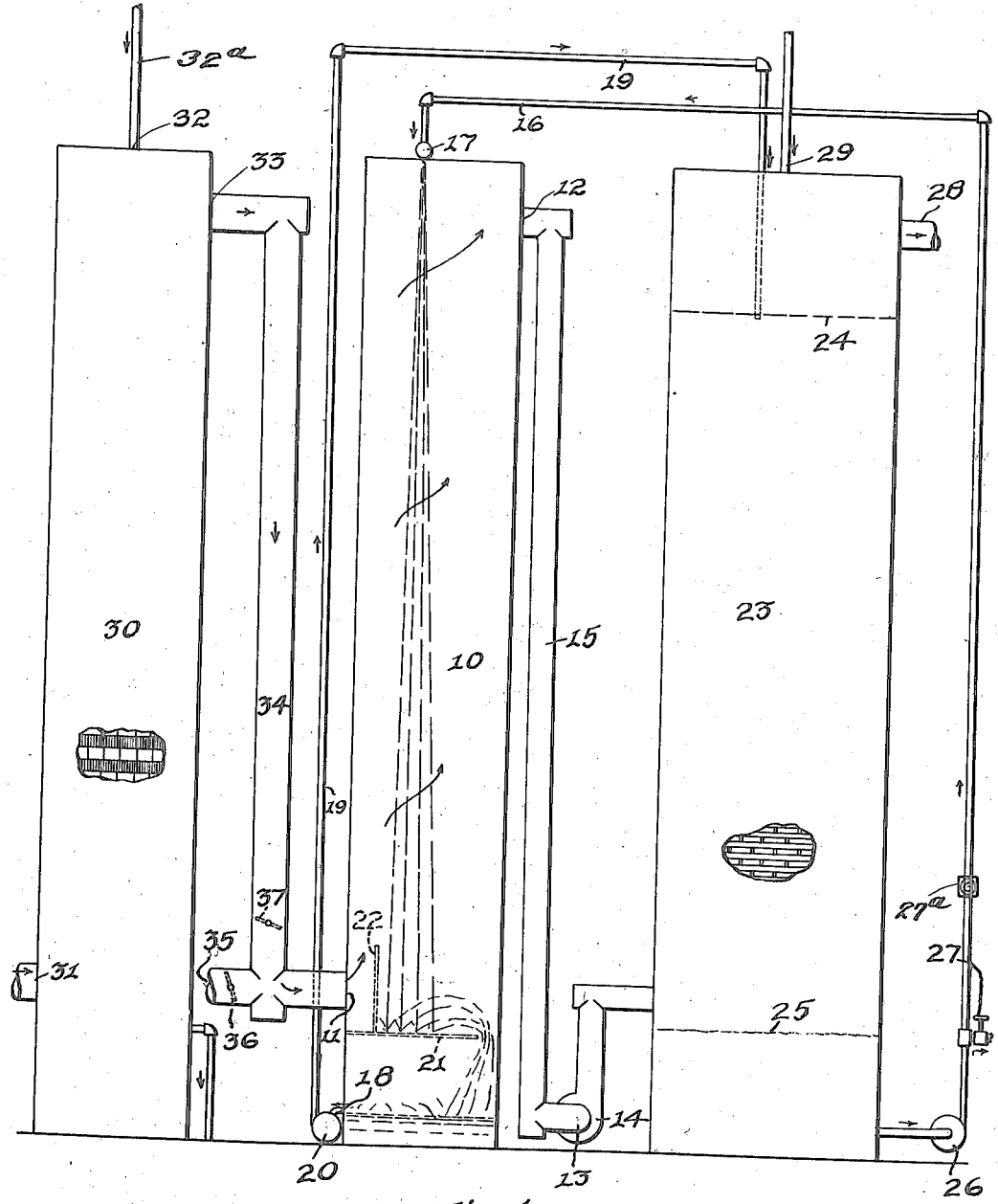

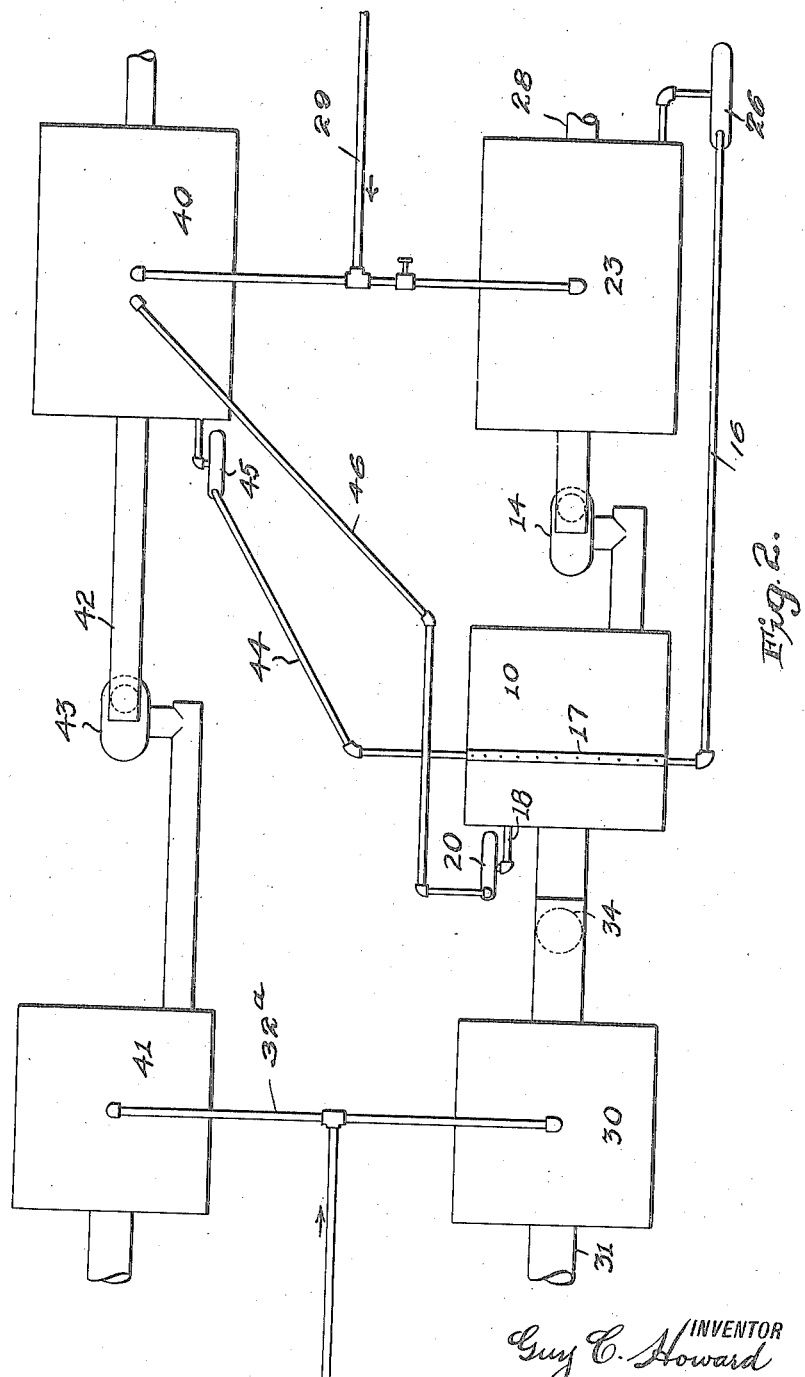

UNITED STATES PATENT OFFICE.

GUY C. HOWARD, OF TACOMA, WASHINGTON, ASSIGNOR TO AMERICAN SMELTING & REFINING COMPANY, A CORPORATION OF NEW JERSEY.

PROCESS FOR ENRICHING METALLURGICAL GASES CONTAINING SULPHUR DIOXIDE.

1,417,066.

Specification of Letters Patent. Patented May 23, 1922.

Application filed November 29, 1918. Serial No. 264,555.

*To all whom it may concern:*

Be it known that I, GUY C. HOWARD, a citizen of the United States, and resident of Tacoma, in the county of Pierce and State of Washington, have invented certain new and useful Improvements in Processes for Enriching Metallurgical Gases Containing Sulphur Dioxide, of which the following is a specification.

The invention relates in general to the art of enriching a gas which can be readily separated from its liquid solution and specifically relates to the art of enriching sulphur dioxide particularly the sulphur dioxide which is recovered from metallurgical gases and used in such arts as the manufacture of sulphuric acid and liquid sulphur dioxide.

According to certain metallurgical processes now practiced, it is usual to recover sulphur dioxide gas from the flue gases by passing the gases through water to obtain a water solution of the same. However, in many operations the sulphur dioxide gas is so extensively diluted with other flue gases as to render its recovery so expensive as to be impractical, if not prohibitive.

Accordingly, the primary object of the invention is to provide a method and incidentally an improved form of apparatus for practicing the method, whereby the sulphur dioxide may be obtained economically from those flue gases which have a low sulphur dioxide content and to effect this recovery continuously on a large commercial scale for rendering available certain furnace gases which are now too dilute for economic handling and incidental to this general object it is a further desideratum to provide a practical method.

Broadly the invention contemplates the formation of a water solution of the sulphur dioxide or other water soluble gases separated from the other metallurgical gases, preferably by first forming what may be called a superstrength solution of the gas. In this specification and claims the expression "superstrength solution" is understood to be any solution stronger in sulphur dioxide gas contents than the strength of the gas would theoretically calculate in accordance with the well-known "partial pressure" law for the solubility of gases. The sulphur dioxide gas is then liberated from the water solution in the presence of low content gas thereby forming a gas rich in sulphur dioxide content. This is effected by subjecting the solution to a treatment or condition essentially opposite to that which produces the saturation, that is, subjecting the solution to conditions favorable to sweeping the weakly held sulphur dioxide gas out of the water and to conditions unfavorable to the absorption of the sulphur dioxide by water. One simple means for effecting this separation is to cause the solution to fall onto a splash plate thereby to mechanically disrupture the liquid and liberate the lightly held sulphur dioxide gas in the presence of the gas which it is desired to enrich.

For the purpose of illustrating an organization of instrumentalities by means of which the above suggested process can be practiced, reference is made to the accompanying drawing, in which Figure 1 illustrates diagrammatically in side elevation the flow chart of a simple plant designed for practicing the above outlined method and;

Figure 2 represents a plane view diagrammatically of a plant showing a modification of the plant suggested in Figure 1.

In the drawings and referring specifically to the disclosure in Figure 1, there is shown an upright tower 10, hereinafter referred to as an enriching tower, having a gas inlet 11 near the bottom at one side and a gas outlet 12 adjacent the top of the opposite side. The outlet is connected to the intake port 13 of an exhauster fan 14 by means of a depending outlet pipe 15. A liquid inlet pipe 16 leads through the top of the tower to a distributing head 17 by means of which incoming liquid can be caused to enter the tower in the form of small streams as indicated in the straight dash lines. A liquid outlet 18 is provided at the bottom of the tower and the liquid therefore is discharged into an upstanding pipe 19 by means of a liquor pump 20.

A horizontally disposed splash plate 21 is positioned within the tower below the gas inlet 11 and in a position to receive the liquid falling from the head 17 and a baffle plate 22 projects upwardly from the splash plate in advance of the inlet 11 and in position to permit the gases from the inlet to rise freely on that side of the falling curtain of liquid which is opposite to the outlet 12. This arrangement is primarily for the purpose of causing the pump 14 to draw on the gases liberated while the liquor is falling and at the splash plate rather than draw on the incoming gases.

Means are provided for recharging the liquid withdrawn from the bottom of the tower 10 with the gases discharged by the fan 14 and for this purpose the pipe 19 leads through the top of a gas absorption tower 23 to a position below the top line of the filler therein indicated by the dash line 24. The fan 14 discharges into the side of the absorption tower adjacent the lower portion thereof and above the liquid level therein indicated by the waved line 25. The liquid in the bottom of the absorption tower is discharged by means of a pump 26 into the pipe 16 leading to the enriching tower.

The pipe 16 is provided with a by-pass controlled by a valve 27 co-operating with a control valve 32ª by the manipulation of which a regulated amount of the liquid may be withdrawn for use in further steps of the process and a proportionate amount may be sent back to form the liquid cycle of the plant, the direction of which is indicated by short arrows. The waste gases not absorbed in the tower 23 are discharged therefrom through the outlet 28 for other treatments not a part of this invention. Fresh water is admitted to the tower 23 through the supply pipe 29 and it is obvious that the flow of the incoming water could be regulated so as to compensate for the water solution withdrawn from the system through the valve 27. Under some conditions, as where the plant is designed to utilize the hot sulphur dioxide gas as it comes off of the smelting furnace it is desirable that the gases be cooled before they are passed either into the absorption tower as suggested in Figure 2 or into the enriching tower as suggested in Figure 1.

For this purpose a cooling tower 30 is positioned convenient to the furnace to receive the hot gases through an inlet 31 adjacent the bottom of the tower. These hot gases are caused to rise through the tower 30 where they are subjected to the cooling and washing action of water supplied by pipe 32ª falling from a head 32. The cooled and washed gases discharged from the cooling tower through an outlet 33 are led to the inlet 11 through a depending pipe 34.

The lower portion of Figure 2 may be considered as a plan view of the parts shown in elevation in Figure 1 except for the transposition of the liquid conduction pipes 16 and 19 from the absorption tower 23 to an additional similar tower 40.

Under other conditions, it is sometimes found to be more economical to provide an additional cooling tower 41 for receiving the furnace gases and the additional absorption tower 40 for receiving the cooled gases from tower 41 through the conduits 42. In this system the conduit 42 is provided with a pump 43 corresponding to the pump 14 for forcing the cooled gases through the absorption tower 40. Water charged with the gas in the tower 40 is conducted through pipe 44 to the distributing head 17 in the enriching tower by means of a pump 45 corresponding to the pump 26. In this case the pipe 46 leads from the pump 20 and discharges into the top of the absorption tower 40 rather than into the tower 23 as was described for the disclosure in Figure 1. In this case all of the strong liquor from the tower 23 is utilized in the further steps of the process and the tower 40 is utilized to supply the enriching gas.

Under some circumstances as where a rich sulphur dioxide gas mixed with suitable proportion of oxygen is desired for delivery to a plant making sulphuric acid, means are provided for admitting a regulated amount of atmospheric air to the enriching tower. For this purpose the equipment is arranged as in Figure 2, excepting that cooling tower 30 and absorption tower 23 are omitted or cut out, with the result that a regulated amount of atmospheric air is admitted through pipe 34 through the extension 35 controlled by a valve 36 co-operating with a control valve 37 to enriching tower 10 and the fan 14 draws a mixture of sulphur dioxide gas and air from enriching tower 10 and delivers it direct to subsequent equipment (not shown) in which it is converted to sulphuric acid.

In operation and for a detailed description, let it be assumed that the inlet 31 is receiving flue gases from a furnace such as the furnace used in connection with the smelting copper, zinc, lead or ores. It will be understood that the fumes passing through the cooling tower 30 are reduced in temperature and the dust and foreign particles removed. With the several pumps in active operation as illustrated in Figure 1 a solution of sulphur dioxide is admitted through the head 17 and falls by gravity onto the splash plate 21 thence out through the outlet 18. Fan 13 acts to create an induced draft condition in the enriching tower 10 drawing the cooled gases in through the inlet 11 in position so as to be mixed with the sulphur dioxide liberated from the falling liquor as it descends and splashes on the splash board. The weak liquor discharged of a certain proportion of its carbon dioxide collects at the bottom of the enriching tower and is withdrawn by the pump 20 and passed either into the absorption tower 23 shown in Figure 1 or into the absorption tower 40 as shown in Figure 2. In either case the weak liquor is recharged with sulphur dioxide from gases which are fed to the absorption towers either by the fan 14 in the case of Figure 1 or by the fan 43 in the case of Figure 2, and the recharged liquor is led back to the enriching tower through pipes 16 or 44.

It is to be understood that in view of the fact that under certain conditions of absorption a solution is produced which carries a larger content of sulphur dioxide than the so called "partial pressure" law of gases would theoretically give and the fact that the sulphur dioxide is only weakly held in its water solution and especially as the superstrength contents are quickly relieved when the solution is removed from the particular conditions which produced it, the process affords a simplified means for removing the sulphur dioxide from its carrying water and provides a simple and economical means for obtaining sulphur dioxide from gases having a low content of such water soluble gas.

Having thus described my invention, I claim:—

1. In the art of forming a substance having a relatively high sulphur dioxide content from a gas having a relatively low sulphur dioxide content, the process which consists in discharging sulphur dioxide gas from a water solution thereof and causing said discharged gas to mix with said relatively low sulphur dioxide content gas thereby to increase the sulphur dioxide content of said low content gas.

2. In the art of forming sulphur dioxide gas, the process of causing a water solution of sulphur dioxide to fall towards and splash against a surface thereby to break the water solution into fine particles and thus facilitate the escape of the sulphur dioxide gas held in solution and causing said gas to traverse the path of the water solution in its falling movement towards the splash surface.

3. In the art of charging a gas with gaseous sulphur dioxide, the process which consists in causing a water solution of sulphur dioxide to fall along a path onto a splash surface thereby to liberate the gaseous sulphur dioxide held in solution while inducing said first named gas to ascend along said path thereby to commingle with the liberated gaseous sulphur dioxide which arises from the splash surface and from the falling liquid before it reaches the splash surface.

4. In the art of forming an enriched sulphur dioxide from gases containing sulphur dioxide, the process which consists in passing the gases through water to form a water solution of sulphur dioxide, subjecting the water solution to conditions favorable to sweeping the sulphur dioxide gas out of the water and causing the gas so liberated from the water solution to be added to other sulphur dioxide gases and thus form an enriched sulphur dioxide gas.

5. In the art of forming a water solution of sulphur dioxide from gases containing sulphur dioxide, the process which consists in passing the gases through water to form a water solution of sulphur dioxide, subjecting the water solution to conditions favorable to sweeping the sulphur dioxide gas out of the water and causing the gas so liberated from the water solution to be added to other sulphur dioxide gases and thus form an enriched sulphur dioxide gas, and forming a water solution of the enriched sulphur dioxide gas.

6. In the art of forming a water solution of sulphur dioxide from hot furnace gases containing a relatively low sulphur dioxide content, the process which consists in cooling said furnace gases, passing a part of the cooled gases through water to form a water solution of sulphur dioxide and releasing the sulphur dioxide from the water in the presence of another portion of the first named cooled gases thereby forming an enriched sulphur dioxide gas from the relatively low sulphur dioxide content furnace gas.

7. In the art of forming a water solution of sulphur dioxide from hot furnace gases containing a relatively low sulphur dioxide content, the process which consists in cooling said furnace gases, passing a part of the cooled gases through water to form a water solution of sulphur dioxide, releasing the sulphur dioxide from the water in the presence of another portion of the first named cooled gases thereby forming an enriched sulphur dioxide gas from the relatively low sulphur dioxide content furnace gas and forming a water solution of said enriched sulphur dioxide gas.

8. In the art of forming a gas containing sulphur dioxide and oxygen, from a gas having a relatively low sulphur dioxide content, the process which consists in introducing into a stream of said gas, the sulphur dioxide liberated by causing a water solution of sulphur dioxide to fall under action of gravity through said stream and strike a splash surface and adding to the gas thus enriched a regulated amount of atmospheric air.

9. In an apparatus for enriching gases, the combination of an enriching tower provided with a splash surface adjacent the bottom thereof, means for leading a liquid into said tower to fall therethrough onto said splash surface, means for admitting a gas into said tower, adjacent the bottom thereof and means adjacent the top of the tower for withdrawing gases formed therein and means for withdrawing from the tower the liquid discharged from said splash surface.

10. In an apparatus for enriching gases, an enriching tower provided with a splash plate adjacent the bottom thereof, means adjacent the top thereof for discharging liquid through the tower so as to fall on said splash plate, said tower provided with a gas inlet on one side adjacent the bottom and with a gas outlet on the opposite side adjacent the top and a baffle plate positioned in said tower and facing said gas inlet to direct the flow of gas upwardly.

11. In an apparatus for enriching gases, an enriching tower provided with a splash plate adjacent the bottom thereof, means adjacent the top thereof for discharging liquid through the tower so as to fall on said splash plate, said tower provided with a gas inlet on one side adjacent the bottom and with a gas outlet on the opposite side adjacent the top, a baffle plate positioned in said tower and facing said gas inlet to direct the flow of gas upwardly and means for maintaining a liquid level in said tower below the liquid receiving surface of said splash plate.

12. In an apparatus for enriching gases, the combination of a tower, means for drawing a gas upwardly through said tower, means adjacent the upper portion of said tower for introducing a water solution of said gas into the same, means adjacent the bottom of the tower for causing the solution to give up part of its gas, and permit it to enrich the gas drawn through the tower and means for removing the waste liquid from the bottom of the tower.

13. In an apparatus for enriching gases, the combination of an enriching tower provided with means for extracting gases from liquids passed therethrough and an absorption tower, provided with means for forming a water solution of gases passing therethrough, of means for leading gases from the top of the enriching tower to the bottom of the absorption tower, means for leading liquid from the bottom of the absorption tower to the top of the enriching tower and means for leading waste liquid from the bottom of the enriching tower to the top of the absorption tower, whereby the waste liquid is charged with gases from the enriching tower and again passed through the enriching tower.

14. In an apparatus for enriching gases, the combination of an enriching tower provided with means for extracting gases from liquids passed therethrough and an absorption tower, provided with means for forming a solution of gases passing therethrough, of means for leading gases from the top of the enriching tower to the bottom of the absorption tower, means for leading liquid from the bottom of the absorption tower to the top of the enriching tower, means for leading waste liquid from the bottom of the enriching tower to the top of the absorption tower, whereby the waste liquid is charged with gases from the enriching tower and a portion thereof again passed through the enriching tower and means for discharging the remaining portion from the absorption tower.

Signed at Tacoma, in the county of Pierce and State of Washington, this 9th day of Nov. A. D. 1918.

GUY C. HOWARD.